(No Model.)
W. J. PERKINS.
CIRCULAR SAW.
No. 320,681. Patented June 23, 1885.
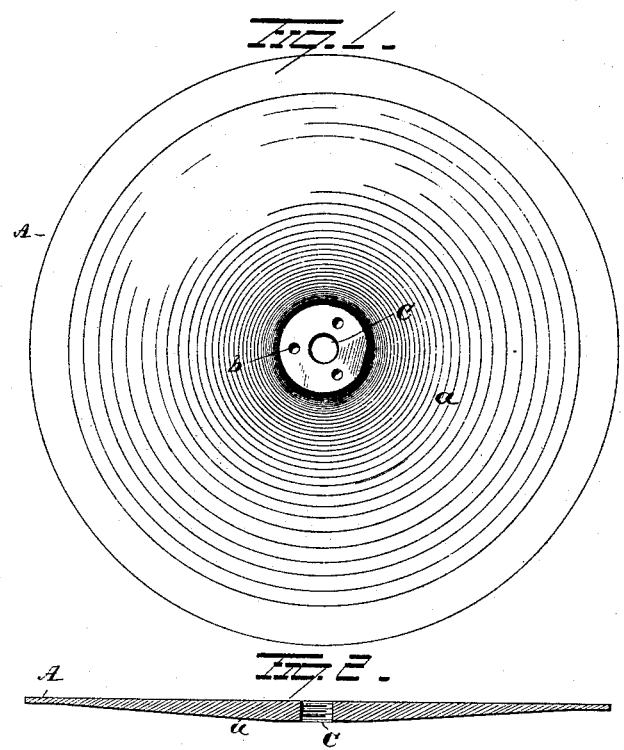
WITNESSES
E. Nottingham
Geo. F. Downing
INVENTOR
W. J. Perkins.
By Leggett & Leggett
Attorney

UNITED STATES PATENT OFFICE.

WILLIS J. PERKINS, OF GRAND RAPIDS, MICHIGAN.

CIRCULAR SAW.

SPECIFICATION forming part of Letters Patent No. 320,681, dated June 23, 1885.

Application filed April 4, 1884. (No model.)

*To all whom it may concern:*

Be it known that I, WILLIS J. PERKINS, of Grand Rapids, in the county of Kent and State of Michigan, have invented certain new and useful Improvements in Circular Saws; and I do hereby declare the following to be a full, clear, and exact description of the invention, such as will enable others skilled in the art to which it appertains to make and use the same.

My invention relates to an improvement in the construction of circular saws.

Hitherto it has been customary to stiffen a circular saw by means of a circular plate or flange of cast-iron secured to the saw-plate by a series of screws; and it has also been customary to mount this saw, constructed as described, upon an arbor provided with a collar or head of iron shrunk or forced thereon. This method of stiffening a circular saw is found to be objectionable for the following reasons, viz: The saw is materially weakened by the series of holes through it necessary to fasten it firmly to the flange. Greater skill is required to produce a perfect saw with a series of holes in it than without, besides the additional cost of manufacturing. The screw or rivet holes are placed back from the edge of flange, so the flange can be of sufficient thickness to hold the screws without a too abrupt taper from face of saw. This causes the saw to be weaker in a direction of strain away from the flange than toward it by the difference of the leverage afforded by the edge of flange extending beyond the circle of the series of screws in the saw. The flange forms an unnecessarily thick body on one side of the saw. The material being sawed strikes against the flange and is spread apart, requiring more labor or power to operate the machine. The screw-holes, usually from twelve to fifteen in number, must be absolutely exact on all saws or the flanges are useless, except for the first saws fitted on them. Any one of the screw-holes varying will make the saw run uneven when the screw is put into it. The saw running true now depends on the truth of four faces—viz., top of arbor-head, bottom of flange, top of flange, back of saw—besides the perfectness of its being fastened to flange, all the faces being true, and, finally, a steel saw and iron flange have different rates of expansion when heated by action, which causes a severe strain upon the fastening devices, and is liable to throw the saw out of true.

The object of my present invention is to overcome these objections and provide a saw which shall be sufficiently stiff without the use of independent strengthening devices.

With these ends in view my invention consists in certain features of construction and combinations of parts, as will be fully described, and pointed out in the claims.

In the accompanying drawings, Figure 1 represents a view of my improved saw, and Fig. 2 a transverse sectional view through the center.

A represents a circular saw made of sufficient thickness about the center to render it stiff enough for the purpose required. The thick portion $a$ extends from the center outward in circular form toward the rim, gradually diminishing in thickness or increasing in thickness for a short distance, and then diminishing or following any other desired shape in transverse section which may be found advantageous. The thick portion, however, will preferably stop as far from the rim as is consistent with the required strength. The extra thickness about the center of the saw may be on one surface only, leaving the other surface of the plate a plane, or it may be on both surfaces, if found desirable. The strengthening-flange, formed integral with the saw, as described, is preferably provided with a plain circular surface, B, about the eye C, which surface is of the same size as the head formed on the arbor.

For the purpose of securing the saw to the arbor, the saw-plate may be provided with three perforations, $b$, (more or less,) adapted to receive screws; or the eye C of the saw may be threaded, and adapted to receive a threaded projection on the end of the arbor. The end of the arbor, passing through eye of the saw, centers it.

Having fully described my invention, what I claim as new, and desire to secure by Letters Patent, is—

1. A circular saw provided with a flat surface on one side and on its opposite side with a stiffening-flange formed integral therewith, the said flange having a plane portion about the eye of the saw, and tapered from said plane portion to the saw-teeth, substantially as herein described, and for the purpose set forth.

2. A circular saw provided with a series of perforations around the eye, with a flat surface on one side, and on its opposite side with a stiffening-flange formed integral therewith, the said flange having a plane portion about the eye of the saw, and tapered from said plane portion to the saw-teeth, substantially as set forth.

3. A circular saw provided with a stiffening-flange formed integral with the saw-plate, said saw being provided with a threaded eye for securing the saw to the arbor, substantially as set forth.

In testimony whereof I have signed this specification in the presence of two subscribing witnesses.

WILLIS J. PERKINS.

Witnesses:
ARTHUR C. DENISON,
CHARLES W. HILES.